United States Patent
Tajima et al.

(10) Patent No.: US 7,052,787 B2
(45) Date of Patent: May 30, 2006

(54) SOLID HIGH POLYMER TYPE FUEL CELL POWER GENERATING DEVICE

(75) Inventors: Osamu Tajima, Osaka (JP); Katsuya Oda, Osaka (JP); Tatsuji Hatayama, Osaka (JP); Ryuji Yukawa, Osaka (JP); Taketoshi Ouki, Osaka (JP); Akira Fuju, Osaka (JP); Koji Shindo, Osaka (JP); Kazuhiro Tajima, Osaka (JP); Satoshi Yamamoto, Osaka (JP); Katsuyuki Makihara, Osaka (JP); Keigo Miyai, Osaka (JP); Masataka Kadowaki, Osaka (JP); Masatoshi Ueda, Osaka (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 283 days.

(21) Appl. No.: 10/221,338

(22) PCT Filed: Jan. 9, 2002

(86) PCT No.: PCT/JP02/00053

§ 371 (c)(1),
(2), (4) Date: Sep. 10, 2002

(87) PCT Pub. No.: WO02/056403

PCT Pub. Date: Jul. 18, 2002

(65) Prior Publication Data

US 2003/0031900 A1 Feb. 13, 2003

(30) Foreign Application Priority Data

| Jan. 12, 2001 | (JP) | ............................. 2001-005782 |
| Jan. 15, 2001 | (JP) | ............................. 2001-006349 |
| Jan. 15, 2001 | (JP) | ............................. 2001-006482 |

(51) Int. Cl.
*H01M 8/04* (2006.01)
*H01M 8/06* (2006.01)

(52) U.S. Cl. .............................. 429/20; 429/24; 429/26
(58) Field of Classification Search .................. 429/20, 429/24, 26
See application file for complete search history.

(56) References Cited

U.S. PATENT DOCUMENTS 6,309,770 B1 * 10/2001 Nagayasu et al. ......... 429/20 X (Continued)

FOREIGN PATENT DOCUMENTS

| JP | 7-220745 A | 8/1995 |
| JP | 8-273689 A | 10/1996 |
| JP | 11-97044 A | 4/1999 |

(Continued)

OTHER PUBLICATIONS

English translation of JP 8-273,689 (Oct. 1996).*
English translation of JP 11-97,044 (Apr. 1999).*
English transaltion of JP 2000-285,942 (Oct. 2000).*

*Primary Examiner*—Stephen J. Kalafut
(74) *Attorney, Agent, or Firm*—Weingarten, Schurgin, Gagnebin & Lebovici LLP (57) ABSTRACT

Proton-exchange membrane fuel-cell power generating equipment includes a heat exchanger coupled to a process burner and, therethrough, to a fan. When water needs to be heated, such as during startup, the water is circulated through the heat exchanger and the process burner is operated (ignited) to heat the water. When the water needs to be cooled, such as when a hot water reserving tank is full, the water is circulated through the heat exchanger and the fan is operated, but the process burner is not operated, to cool the water. Water is circulated through part or all of a water system to prevent freezing while the system is stopped. Optionally, the process burner is operated to heat the circulated water. The heat exchanger and other heat exchangers in the system are arranged to efficiently recover heat from burners, a fuel-cell cooling system and exothermic processes.

26 Claims, 7 Drawing Sheets

U.S. PATENT DOCUMENTS

| | | | |
|---|---|---|---|
| 6,428,919 B1 * | 8/2002 | Takahashi et al. | 429/20 X |
| 6,432,568 B1 * | 8/2002 | Salvador et al. | 429/24 X |
| 6,444,338 B1 * | 9/2002 | Araki et al. | 429/24 |

FOREIGN PATENT DOCUMENTS

| | | |
|---|---|---|
| JP | 2000-285942 A | 10/2000 |
| JP | 2001-291525 A | 10/2001 |

* cited by examiner

SOLID HIGH POLYMER TYPE FUEL CELL POWER GENERATING DEVICE

FIELD OF THE INVENTION

The present invention relates to proton-exchange membrane fuel cell power generating equipment and, more particularly, to exhaust heat recovery and freezing prevention devices in such equipment.

BACKGROUND ART

Conventional proton-exchange membrane fuel cell power generating equipment suitable as a small power supply typically comprises a reformer for reforming fuel gas, such as natural gas, town gas, methanol, liquefied petroleum gas (LPG), or butane, to hydrogen rich gas; a CO transformer for transforming carbon monoxide to $CO_2$; CO removing apparatus for removing the carbon monoxide; a process gas burner for burning hydrogen until each reactor becomes stable during startup; a fuel cell for chemically reacting the hydrogen with oxygen from the air to generate power; a water tank for storing water that is treated by water treating apparatus using an ion-exchange resin or the like to cool an electrode part of the fuel cell and moisten the reaction air; a heat exchanger for recovering heat from exhaust gas from the reformer, the fuel cell, the process gas burner, or the like to produce hot water; and a hot water reserving tank for reserving the hot water.

A solid polymer electrolyte membrane used in such proton-exchange membrane fuel cell power generating equipment functions as a proton conductive electrolyte by containing water. The proton-exchange membrane fuel cell is operated by saturating the reaction air or reaction gas, such as fuel gas, with steam and supplying it to the electrode part.

Figure 7:
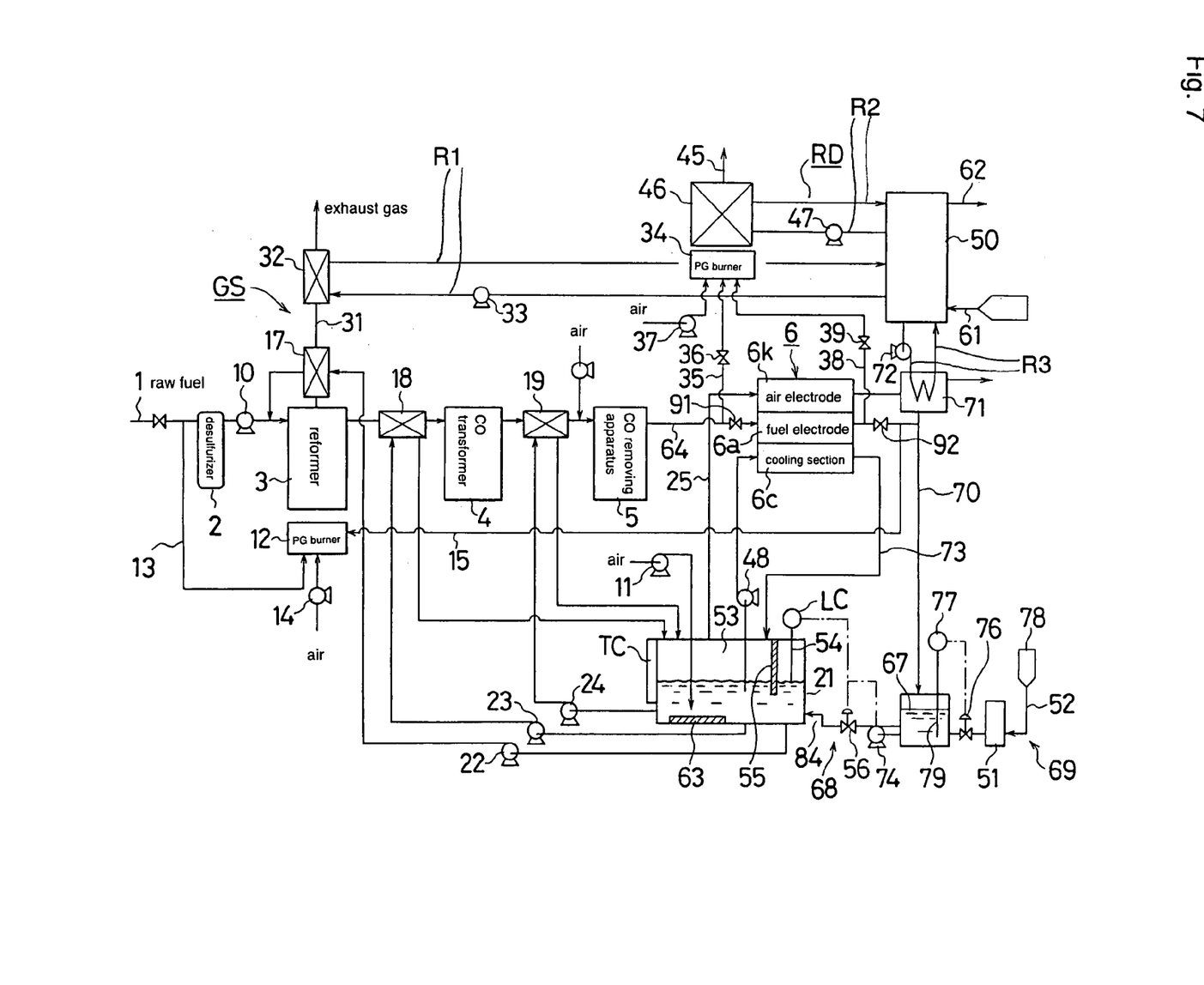
FIG. 7 is a system diagram of conventional proton-exchange membrane fuel cell power generating equipment.

When fuel gas containing hydrogen is fed to a fuel electrode and air is fed to an air electrode, a fuel electrode reaction for decomposing hydrogen molecules to hydrogen ions and electrons is performed in the fuel electrode, and an electrochemical reaction for generating water from oxygen with hydrogen ions in the air electrode occurs. Thus, the electrons moving through an external circuit from the fuel electrode to the air electrode carry power to a load and generate water on the air electrode side. FIG. 7 is a diagram of a conventional proton-exchange membrane fuel cell power generating equipment system (PEFC equipment GS). PEFC equipment GS typically includes an exhaust heat recovery device RD in addition to a fuel cell 6. The exhaust heat recovery device RD is coupled to a hot water reserving tank 50, heat exchanges 32, 46, 71, and pumps 33, 47, 72 through a hot water circuit or the like.

The fuel cell 6 has fuel gas feeding apparatus comprising a desulfurizer 2; a reformer 3; a CO transformer 4; CO removing apparatus 5 and the like; reaction air feeding apparatus comprising an air pump 11, a water tank 21 (distinct from the hot water reserving tank 50), and the like; electrodes, such as a fuel electrode 6a and an air electrode 6k; and cooling apparatus of the fuel cell 6, comprising the water tank 21, a pump 48, a cooling section 6c, and the like.

Power generated by the fuel cell 6 is increased in voltage by a direct current DC/DC converter (not shown) and is supplied to the commercial power supply via an electric distribution system cooperation inverter (not shown). The power is supplied from the power supply to houses or offices to be used for illumination or electric equipment, such as air conditioners.

The PEFC equipment GS uses the fuel cell 6 to generate power and uses heat generated at the same time to produce hot water from city water, accumulates the hot water in the hot water reserving tank 50, and supplies the hot water, such as for use in a bath or kitchen.

In the fuel gas feeding apparatus of the PEFC equipment GS, raw fuel 1, such as natural gas, town gas, methanol, LPG, or butane, is supplied to the desulfurizer 2, and here sulfur components are removed from the raw fuel. The raw fuel, having passed through the desulfurizer 2, is pressurized by a pressurizing pump 10 and supplied to the reformer 3. The raw fuel, while being supplied, is mixed with steam produced by feeding hot water from the water tank 21 through a water pump 22 and heating the hot water in a heat exchanger 17. The reformer 3 produces reformed gas containing hydrogen, carbon dioxide, and carbon monoxide. The reformed gas produced in the reformer 3 is supplied to the CO transformer 4, and here the carbon monoxide contained in the reformed gas is transformed to carbon dioxide. The gas from the CO transformer 4 is supplied to the CO removing apparatus 5. In the CO removing apparatus 5, untransformed carbon monoxide in the gas supplied from the CO transformer 4 is reduced to 10 ppm or less, and water gas (reformed gas) having a high hydrogen concentration is supplied to the fuel electrode 6a of the fuel cell 6 through a pipe 64. The amount of hot water supplied from the water tank 21 to the reformer 3 is adjusted to control moisture concentration in reformed gas.

In the reaction air feeding apparatus, air is fed from the air pump 11 to the water tank 21, and the reaction air is whipped in the hot water in the water tank 21 and is fed to a gas phase section 53, thereby moistening the reaction air. The air is moistened to facilitate the reaction in the fuel cell 6. The moistened reaction air is fed to the air electrode 6k of the fuel cell 6 from the water tank 21 through a pipe 25. The fuel cell 6 generates power by an electrochemical reaction of the hydrogen of the reformed gas fed to the fuel electrode 6a with oxygen in the air supplied to the air electrode 6k through the air pump 11 and the gas phase section 53 in the water tank 21.

The cooling apparatus of the fuel cell 6 is arranged along with the electrodes 6a, 6k of the fuel cell 6, and prevents the fuel cell 6 from being overheated by heat of the electrochemical reaction. The cooling apparatus circulates water from the water tank 21 as a coolant to a cooling section 6c with a pump 48, and the coolant maintains a proper temperature in the fuel cell 6 (for example, 70–80° C.) for the power generation.

The chemical reaction in the reformer 3 is an endothermic reaction, so that a burner 12 provides heat to the reformer 3 to maintain the chemical reaction. To the burner 12, raw fuel is supplied through a pipe 13, air is fed through a fan 14, and unreacted hydrogen is supplied from the fuel electrode 6a through a pipe 15. During startup of the PEFC equipment GS, the raw fuel is supplied through the pipe 13 to the burner 12. When the temperature of the fuel cell 6 becomes stable, the supply of the raw fuel through the pipe 13 is stopped, and, instead, the unreacted hydrogen (off-gas) discharged from the fuel electrode 6a is supplied through the pipe 15 to continue the combustion.

The chemical reactions performed in the CO transformer 4 and the CO removing apparatus 5 are exothermic reactions. During their operation, the CO transformer 4 and the CO removing apparatus 5 are cooled to prevent the CO transformer and the CO removing apparatus from reaching a reaction temperature. Predetermined chemical reactions and power generation occur in the reformer 3, the CO transformer 4, the CO removing apparatus 5, and the fuel cell 6.

Heat exchangers 18 and 19 are installed between the reformer 3 and the CO transformer 4, and between the CO transformer 4 and the CO removing apparatus 5, respectively. The water supplied from the water tank 21 circulates in the respective heat exchangers 18, 19 via pumps 23, 24, and cools respective gasses fed from the reformer 3 and the CO transformer 4. Another heat exchanger (not shown) may be also installed between the CO removing apparatus 5 and the fuel cell 6 to cool gas fed from the CO removing apparatus 5.

The heat exchanger 17 is connected to an exhaust system 31 of the reformer 3. When water is supplied from the water tank 21 via a pump 22, the heat exchanger 17 vaporizes the water to produce steam, and the steam mixes with the raw fuel and is fed to the reformer 3.

The PEFC equipment GS has a process gas burner (PG burner) 34. During-startup of the PEFC equipment GS, the composition of the reformed gas fed through the reformer 3, the CO transformer 4, and the CO removing apparatus 5 does not reach a defined stable value preferable for the operation of the fuel cell 6. Therefore, the gas cannot be fed to the fuel cell 6 until the composition becomes stable. Until each reactor becomes stable, the gas is guided to the PG burner 34 and burned in it. A fan 37 feeds air for combustion to the PG burner 34.

After each reactor becomes stable and the CO concentration in the gas reaches a defined value (for example, 10–20 ppm or lower), the gas is guided to the fuel cell 6 for power generation. Unreacted gas (off-gas) that cannot be used for power generation in the fuel cell 6 is initially guided to the PG burner 34 and burned, and, after the temperature of the fuel cell 6 becomes stable, the unreacted gas is guided to the burner 12 of the reformer 3 through a pipe 15.

Until each reactor becomes stable in temperature, on-off valve 91 is closed, and the reformed gas is fed to the PG burner 34 through the duct 35 and on-off valve 36. Even after the reactors become stable in temperature, until the temperature of the fuel cell 6 becomes stable in a range that is appropriate for producing electricity (for example, 70–80° C.), the on-off valve 91 is opened while the on-off valve 92 is closed, and the reformed gas is fed to the PG burner 34 through a duct 38 and an on-off valve 39, and the gas is burned in the PG burner. When the temperature of the fuel cell 6 becomes stable and appropriate for continuous power generation, both the on-off valve 91 and the on-off valve 92 are opened, while the on-off valve 36 and the on-off valve 39 are closed, and the unreacted gas (off-gas) is fed from the fuel cell 6 to the burner 12 through a duct 15.

City water is supplied to the hot water reserving tank 50 through an inlet 61. The water in the hot water reserving tank 50 is heated by exhaust heat generated from the PEFC equipment GS, and the heated water is supplied through the hot water supply pipe 62 to, for example, a kitchen, lavatory, or bath.

PEFC equipment typically includes several water circuits for recovering heat from exhaust gases. For example, heat is recovered from these exhaust gases and stored in the hot water reserving tank 50. Exhaust system 31 is connected to heat exchanger 32, in addition to heat exchanger 17, and the water in the hot water reserving tank 50 circulates in the heat exchanger 32 via pump 33 to recover heat from the exhaust gases passing through the exhaust system 31. Heat exchanger 46 is connected to exhaust system 45 of the PG burner 34, and the water in the hot water reserving tank 50 circulates in the heat exchanger 46 via pump 47 for exhaust heat recovery.

Heat is also recovered from exothermic chemical processes and stored in water tank 21. Water returned from the heat exchangers 18, 19 by pumps 23, 24, and coolant circulating in the cooling section 6c of the fuel cell 6, through water duct 73 and pump 48, flow into the water tank 21.

Water refilling apparatus 68 is connected to the water tank 21 to maintain a water level in the tank 21. The water refilling apparatus 68 includes an electromagnetic valve 56, a supply tank 67, and a pump 74. The supply tank 67 temporarily reserves water from city water refilling apparatus 69 and water recovered from the fuel cell 6 through a pipe 70. The supply tank 67 supplies the water to the water tank 21 as needed to maintain the water level in the tank 21. Water generated from the fuel cell 6 includes drain water obtained by a cooling system that includes the heat exchanger 71, the hot water reserving tank 50, circulating pump 72, as well as the water (condensate) contained in the gas exhausted from the fuel electrode 6a.

The city water refilling apparatus 69 is connected to the water source 78 and includes an inlet 52 and an electromagnetic valve 76, which is opened by water level controller 77 when a water level gauge 79 detects an insufficient amount of water in the supply tank 67. The supply tank 67 is refilled through the inlet 52 and water treating apparatus (ion-exchange resin) 51, which uses the water pressure of the water source 78.

The water tank 21 includes a water level controller LC for keeping a water level sufficient to form an air section (gas phase section) 53 in the upper part of the tank and a temperature adjusting apparatus TC for keeping the temperature of the water in the tank 21 in a predetermined range. The water level controller LC includes a water level gauge 54 and an electromagnetic valve 56 for monitoring the water level in the water tank 21 and adding water as needed. Air passing through the water tank 21 is moisturized before being supplied to the fuel cell to facilitate the fuel cell reaction. The water level controller LC controls the water level so as to form the gas phase section 53 in the upper part of the water tank 21. When the water level decreases, the water level controller LC operates the pump 74, adjusts the opening of the electromagnetic valve 56 to feed treated water from the supply tank 67, through the pipe 84, into the water tank 21. The controller LC thus keeps the water level in the water tank 21 within the predetermined range.

A wave breaking plate 55 prevents the water level detection by the water level gauge 54 from being destabilized by foaming. The temperature control apparatus TC keeps the temperature of the water in the water tank 21 at a predetermined value or range, for example 60–80° C., so as to properly moisturize the reaction air supplied to the air electrode 6k of the fuel cell 6.

The water in the water tank 21 is heated by a heating device 63 installed in the water tank 21 if necessary.

The heat exchange between the water in the hot water reserving tank 50 and the heat exchanger in the fuel cell power generating equipment GS, as shown in FIG. 7, uses: a first circuit R1 between the tank and the first heat exchanger 32, through which combustion exhaust gas from the burner 12 of the reformer 3 passes; a second circuit R2 between the tank and the second heat exchanger 46 through which combustion exhaust gas from the PG burner 34 passes; and a third circuit R3 between the tank and a third heat exchanger 71 through which non-reacted oxygen gas exhausted from the air electrode of the fuel cell 6 passes. In other words, the heat exchange is performed between water fed from the hot water reserving tank 50 and the combustion exhaust gases or unreacted oxygen gas from the first heat exchanger 32, the second heat exchanger 46, and the third heat exchanger 71.

The PEFC equipment GS as discussed above is configured as a cogeneration system for power generation and heat utilization, so that the power generating efficiency of the fuel cell is relatively high and the water used in the system is effectively recycled.

However, when the hot water reserving tank 50 is full of hot water of a predetermined temperature, and the hot water cannot be discharged to the outside through the hot water supply pipe 62, additional exhaust heat from the gases cannot be recovered. Therefore, in order to keep the temperature of the coolant in the fuel cell 6 in a predetermined range, another cooling apparatus, such as a radiator (not shown), must be installed or operation of the equipment must be stopped. The installation of the cooling apparatus increases cost, and it makes reducing the size of the PEFC equipment GS difficult.

A layer of water at room temperature lies at the bottom of the hot water reserving tank 50, and a hot water layer with a lower density lies in the upper part of the tank. If no hot water is drawn from the hot water reserving tank 50 for an extended period of time while the system operates, the water in the bottom of the tank is heated by the heat exchanger and moves to the upper part, so that the hot water layer gradually increases and finally the tank is entirely filled with hot water.

When hot water is drawn from the hot water tank 50, hot water in the upper part is taken out to reduce the hot water layer, and city water is added into the bottom in proportion to the amount of hot water drawn off, resulting in an increase of the cooler water layer. Therefore, the temperature of the water fed from the bottom of the hot water reserving tank 50 to the heat exchangers is not constant, and heat exchanging efficiencies of the heat exchangers fluctuate. Furthermore, combustion exhaust gases passing through the three heat exchangers 32, 46, 71 contain gases having different temperatures. Consequently, the heat exchanging efficiencies fluctuate according to the temperature fluctuations of the water fed from the hot water reserving tank 50, resulting in low efficiency when the temperature difference is small.

In addition, if the water in the tank 21 decreases in temperature and freezes the water tank 21, the fuel cell 6, as well as piping lines and valves may be damaged, resulting in a malfunction of the equipment.

BRIEF SUMMARY OF THE INVENTION

It is an object of the invention to provide proton-exchange membrane fuel cell power generating equipment that addresses the problems discussed above. According to one aspect of the presently disclosed system, PEFC equipment maintains the temperature of the coolant of the fuel cell 6 within a predetermined range, without additional cooling apparatus and without stopping operation of the power generating equipment, even if the hot water reserving tank 50 becomes full of hot water and the hot water can not be discharged from the system.

According to another aspect of the presently disclosed system, the PEFC equipment prevents freezing of the water system while operation of the power generating equipment is stopped. This prevents damage to, for example, the water tank 21, the fuel cell 6, the hot water reserving tank 50, the heat exchangers 32, 46, 71, the piping system, the valves, the pumps, and the pipes in the water system.

According to yet another aspect of the presently disclosed system, the PEFC equipment provides improved exhaust heat recovery from the plural heat exchangers.

According to another aspect of the presently disclosed system, the PEFC equipment recovers heat from a fuel cell cooling subsystem.

According to yet another aspect of the presently disclosed system, the PEFC equipment heats a fuel cell using a combination of hot gas and hot liquid.

According to one embodiment of the present invention, proton-exchange membrane fuel cell power generating equipment includes a reformer for reforming fuel gas, such as natural gas, town gas, methanol, LPG, or butane, to hydrogen rich gas; a CO transformer for transforming carbon monoxide; CO removing apparatus for removing the carbon monoxide; a process gas burner for burning hydrogen until each reactor becomes stable; a fuel cell for generating power using hydrogen; a water tank for storing water for cooling the fuel cell; a heat exchanger for recovering heat from combined exhaust gas of the reformer, the fuel cell and/or the process gas burner and heating the water to produce hot water; and a hot water reserving tank for reserving the hot water.

The power generating equipment has a line for circulating water between the hot water reserving tank and the heat exchanger connected to the process gas burner. The temperature of the water is maintained by exchanging heat in the heat exchanger to either heat or cool the water in the water tank, as necessary. If the water in the water tank becomes too hot, i.e., the water reaches a predetermined high temperature, the hot water is circulated through the line to cool the water by radiation from the line. Optionally, a fan that is otherwise used for feeding air to the process gas burner for combustion is operated to cool the hot water as the hot water flows through the heat exchanger. During this time, the process burner is not operated, i.e., gas is not burned in the process burner. During this time, the heat exchanger acts as a cooler, and the cooled water is fed back to the water tank. If the water in the water tank becomes too cool, i.e., the water reaches a predetermined low temperature, the water can be circulated through the heat exchanger connected to the process burner and the process burner can be operated, i.e. gas is burned in the process burner, to heat the water. Thus, the temperature of the hot water in the water tank is kept within a predetermined range, without ceasing operation of the power generating equipment or installing separate cooling apparatus, such as a radiator.

A fuel cell cooling subsystem circulates water from a water tank (distinct from the hot water reserving tank) through the fuel cell and then back to the water tank. At startup time, if the water in the water tank is below a predetermined temperature, the process gas burner is operated and water is circulated through the heat exchanger connected to the process burner. This heated water is circulated through a heat exchanger in the water tank to heat the water in the water tank. Since the water in the water tank circulates through the fuel cell, the fuel cell is heated to an operating temperature more quickly. Once the water in the water tank reaches the predetermined temperature, the process burner and the water circulation through the heat exchanger in the water tank are stopped.

The fuel cell can also be heated, such as during startup, by circulating warm water through the cooling section of the fuel cell and/or by blowing hot air through the air electrode of the fuel cell. The air can be heated in the fuel cell cooling subsystem water tank.

During operation of the fuel cell, if the water in the water tank of the fuel cell cooling subsystem increases and reaches a predetermined temperature, water is circulated through the heat exchanger in the water tank to recover heat from the water in the water tank. The recovered heat is transferred to the hot water reserving tank. Maintaining the water in the fuel cell cooling subsystem at a relatively constant value or in a predetermined range increases the efficiency of chemical reactions. As noted above, if the water in the hot water reserving tank becomes too hot, water is circulated through the heat exchanger connected to the process burner to "dump" the excess heat.

The power generating equipment has a control system which prevents freezing of water in the equipment while the equipment is stopped. If the control system detects a risk of freezing, hot water from the hot water reserving tank is circulated through part or all of the water system. The process gas burner can, but need not, be operated to heat the water.

If the control system detects a risk of freezing in the water tank of the fuel cell cooling subsystem, hot water from the how water reserving tank is circulated through the heat exchanger in the water tank of the fuel cell cooling system, thereby preventing freezing. If the control system detects a risk of freezing in the fuel cell, warm water from the fuel cell cooling system water tank is circulated through the cooling section of the fuel cell, thereby preventing freezing.

In one embodiment, a means for detecting a possibility of freezing is a means for detecting the temperature of the water tank. When the temperature of the water tank is below a predetermined value, hot water is circulated through part or all of the water system to prevent freezing.

In another embodiment, the means for detecting a possibility of freezing is a means for detecting the temperature of the fuel cell body. In yet another embodiment, the means for detecting a possibility of freezing is a means for detecting the temperature of the atmosphere in the power generating equipment.

The proton-exchange membrane fuel cell power generating equipment of the present invention has the following control system. When the temperature of the water, for example, in the water tank 21, falls to about 2° C. while the power generating equipment is not operating, or the temperature of the fuel cell 6 body or the temperature of the atmosphere in the power generating equipment falls to a point where a risk of freezing exists, the control system operates the process gas burner 34, heats hot water in the hot water reserving tank 50, circulates hot water in a part or the whole of the water system, including the water tank 21, and operates the pump 48 to circulate hot water in the cooling section 6c of the fuel cell 6 to increase the temperature of the fuel cell 6 body, thereby preventing freezing. Optionally, the control system circulates the hot water in the hot water reserving tank 50, without operating the process burner 34. The control system prevents damage due to freezing of the fuel cell 6 body, the water tank 21, the fuel cell 6, the hot water reserving tank 50, and the water system, including heat exchangers 32, 46, 71, the piping system, valves, pumps, and pipes, saving maintenance manpower in a cold region or in the winter season and improving reliability. The power generating equipment can, therefore, be used as, for example, a small power supply for a household in a cold region.

The hot water reserving tank and the plural heat exchangers installed in the fuel cell power generating equipment are interconnected by piping to form a loop-like (serial) duct. Water in the hot water reserving tank passes sequentially through the respective heat exchangers via the duct to heat the water. The water passes through the heat exchangers in an order, i.e. through heat exchangers operating at lower temperatures, then through heat exchangers operating at progressively higher temperatures and finally to the hot water reserving tank. The first heat exchanger is heated by combustion exhaust gas from the reformer burner of the reforming apparatus. The second heat exchanger is heated by combustion exhaust gas from the PG (process gas) burner. The third heat exchanger is thermally coupled to the fuel cell. The fourth heat exchanger is connected to a duct, through which the combined combustion exhaust gases from the reformer burner and the PG burner and the non-reacted oxygen gas from the fuel cell flow.

In the above-mentioned fuel cell power generating equipment, the loop-like duct extends from the hot water reserving tank, through the fourth heat exchanger, the third heat exchanger, and the first heat exchanger (in that order), then back to the hot water reserving tank. A first selector valve is installed in the duct between the heat exchanger and the hot water reserving tank. A branch duct branches from an intermediate point between the first selector valve and the second heat exchanger. The branch duct connects to the water tank. On the upstream side of the water tank in the branch duct, a second selector valve is installed. When the water temperature of the water tank is at or above a predetermined temperature, during power generation by the fuel cell, the first selector valve is closed and the second selector valve is opened to pass water through the branch duct to recover heat from the water tank. When the water temperature of the water tank is below the predetermined temperature, the first selector valve is opened and the second selector valve is closed, and no water flows through the branch duct.

Unlike the prior art, in which the hot water reserving tank is connected to each of several heat exchangers by a separate circuit, according to the present disclosure, a series of ducts form a loop-like duct that connects plural heat exchangers in series, and the water flows sequentially through the heat exchangers in a particular order, i.e., through heat exchangers operating at progressively higher temperatures. Therefore, even though the temperature of the water from the hot water reserving tank fluctuates, the heat exchanging efficiencies of the heat exchangers is increased.

BRIEF DESCRIPTION OF THE DRAWINGS

The exemplary embodiments of the present invention are described in detail with reference to the accompanying drawings, in which.

DETAILED DESCRIPTION OF THE INVENTION

FIG. 1 to FIG. 6 illustrate the proton-exchange membrane fuel cell power generating equipment in accordance with an exemplary embodiment of the present invention. Elements in FIGS. 1–6 that are similar to those in FIG. 7 have the same reference numbers as in FIG. 7, and duplicate descriptions for those elements are omitted.

Figure 1:
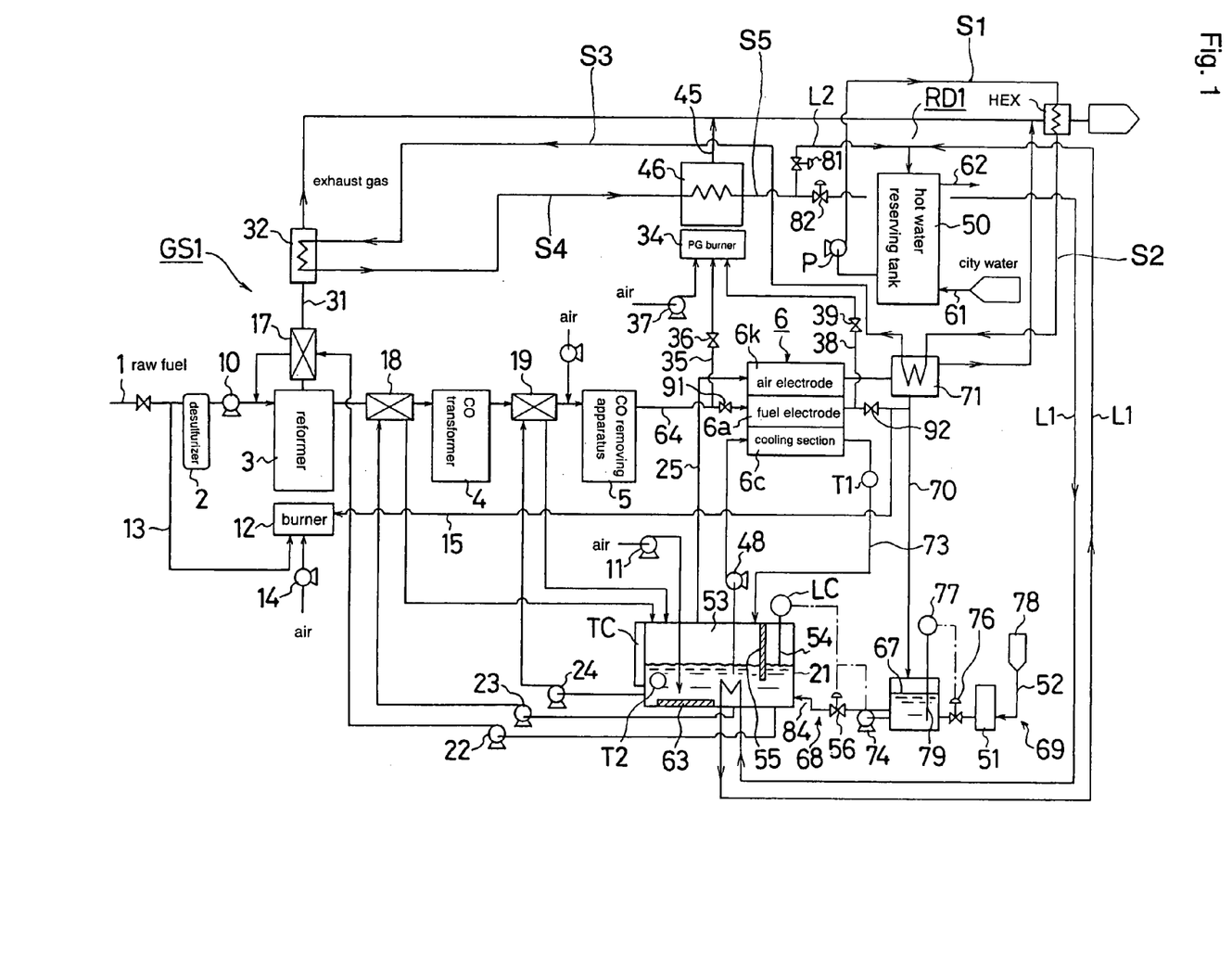
FIG. 1 is a system diagram of proton-exchange membrane fuel cell power generating equipment in accordance with an exemplary embodiment of the present invention.
Figure 2:
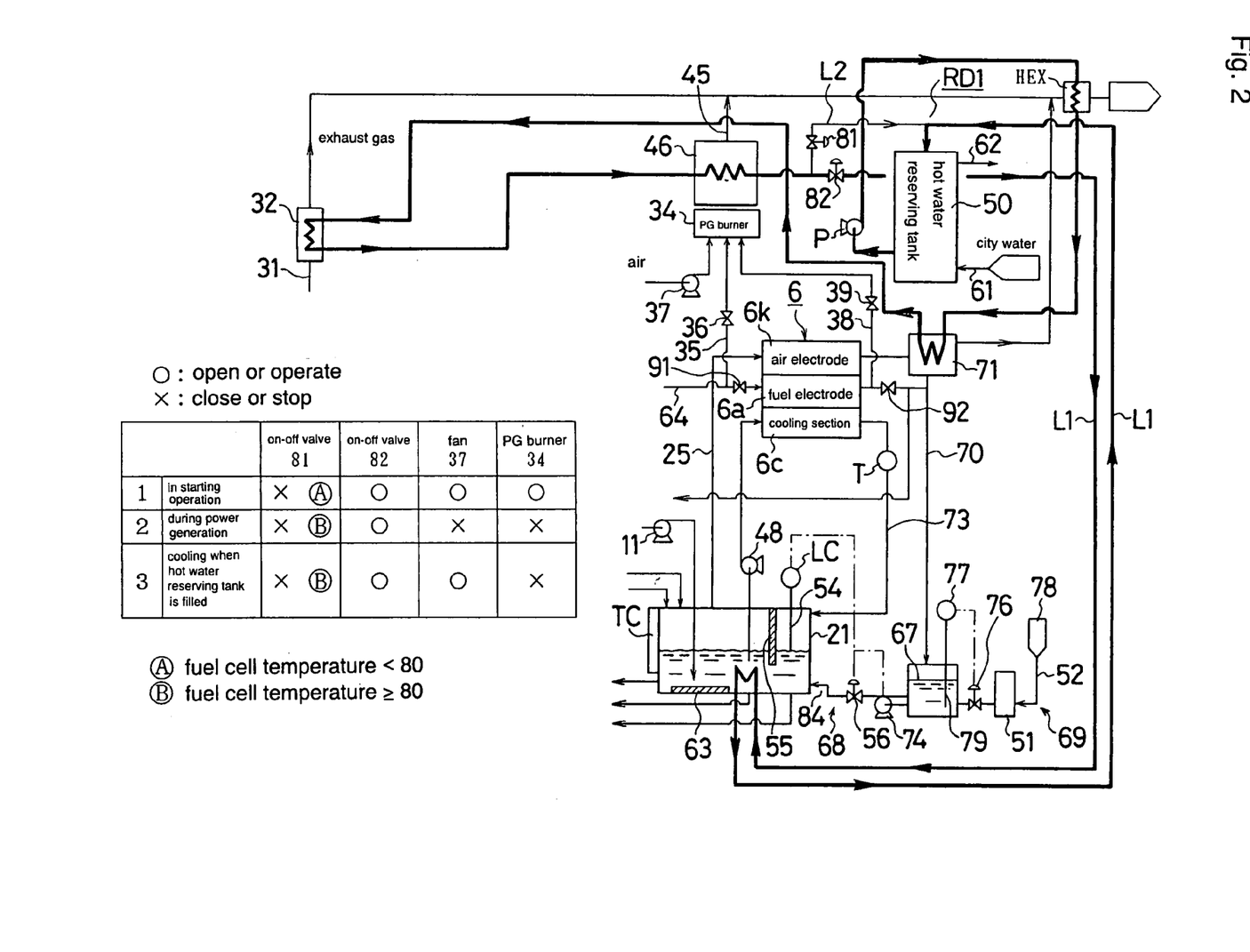
FIG. 2 is a diagram of an exemplary hot water flow in the heat recovery device in the proton-exchange membrane fuel cell power generating equipment of FIG. 1.
Figure 3:
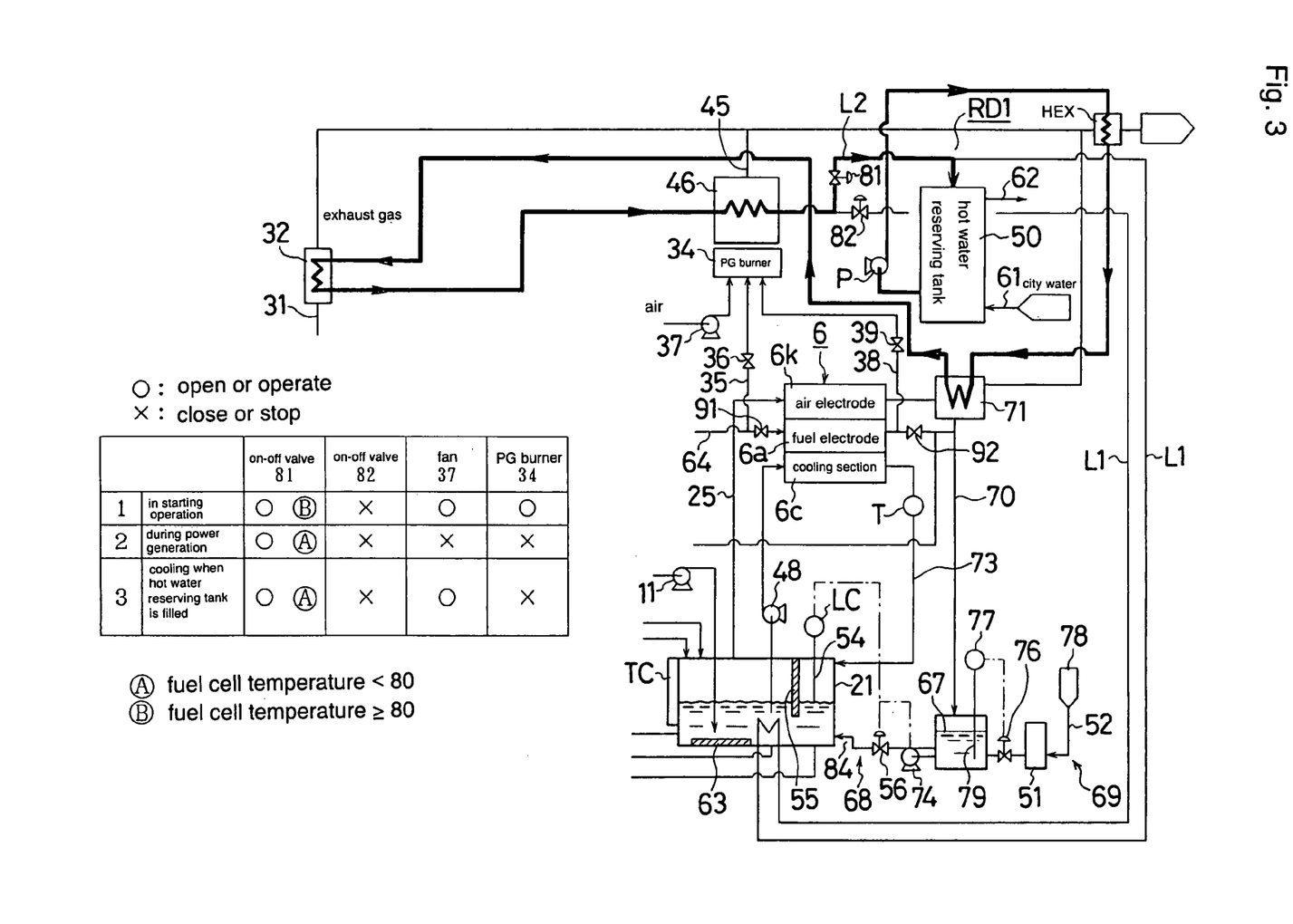
FIG. 3 is a diagram of another hot water flow in the heat recovery device in the proton-exchange membrane fuel cell power generating equipment of FIG. 1.

The proton-exchange membrane fuel cell power generating equipment GS1 of the present invention shown in FIG. 1 includes a heat exchanger HEX at the back of the heat exchanger 71 for extracting heat from a combination of gases exhausted from several sources, including the heat exchanger 32 of the exhaust system 31, the heat exchanger 46 of the exhaust from the process gas burner 34, and the air electrode 6k of the fuel cell 6. The equipment also includes a line L1 for circulating hot water through a heat exchanger located in the water tank 21. The water in the hot water reserving tank 50 recovers exhaust heat through it's the water's circulation among the heat exchanger HEX and the heat exchangers 71, 32, 46. Pump P circulates the water among these heat exchangers and the hot water reserving tank 50. The power generating equipment has a line L2 for feeding the hot water to the hot water reserving tank 50 when the hot water does not need to be fed to the water tank 21 through the line L1. The line L1 has an on-off valve 82, and the line L2 has an on-off valve 81. A water pipe 73 has a thermometer T1 indicating the temperature of coolant flowing through the pipe. A thermometer T2 is disposed in the water tank 21 for detecting the temperature of the water in the tank 21. The proton-exchange membrane fuel cell power generating equipment GS1 of the present invention is similar to the equipment shown in FIG. 7, however, among other things, the power generating equipment GS1 includes a heat recovery device RD 1.

1. (During Startup of the Proton-exchange Membrane Fuel Cell Power Generating Equipment GS1 of the Present Invention)

During startup of the fuel cell 6, the fan 37 and the PG burner 34 are activated. If the temperature (measured by the thermometer T2) of the water in the tank 21 is lower than a predetermined value (for example, less than 80° C.), the on-off valve 81 is closed and the on-off valve 82 is opened to circulate water (that has been heated by recovering exhaust heat) into the line L1 to heat the water in the water tank 21. (See FIG. 2.) The table in FIG. 2 indicates open/close states of the on-off valves 81, 82 and operating or stopping of the fan 37 and the PG burner 34.

If the temperature (measured by the thermometer T2) of the water in the tank 21 is reaches or exceedsthe predetermined value (for example, 80° C. or higher), the on-off valve 81 is opened and the on-off valve 82 is closed to feed water (that has been heated by recovering exhaust heat) to the hot water reserving tank 50 through the line L2. (See FIG. 3.) The table in FIG. 3 indicates open/close states of the on-off valves 81, 82 and operating or stopping of the fan 37 and the PG burner 34).

2. (During Power Generation by the Proton-Exchange Membrane Fuel Cell Power Generating Equipment GS1 of the Present Invention)

During power generation by the fuel cell 6, the fan 37 and the PG burner 34 are typically stopped. If the hot water reserving tank 50 is not filled with hot water and the temperature (measured by the thermometer T2) of the water in the tank 21 is lower than the predetermined value (for example, lower than 80° C.), the on-off valve 81 is opened and the on-off valve 82 is closed so as not to feed hot water to the line L1, but to feed the water (that has been heated by recovering exhaust heat) to the water reserving tank 50 through the line L2. (See FIG. 3.) The table in FIG. 3 indicates open/close states of the on-off valve 81, 82 and operating or stopping of the fan 37 and the PG burner 34.

If the hot water reserving tank 50 is not filled with hot water, but the temperature (measured by the thermometer T2) of the water in the tank 21 is equal to or greater than the predetermined value (for example, 80° C. or higher), the on-off valve 81 is closed and the on-off valve 82 is opened to circulate water through the line L1 to cool the water in the water tank 21. (See FIG. 2.) Heat is recovered from the tank 21 and stored in the hot water reserving tank 50. The table in FIG. 2 indicates open/close states of the on-off valve 81, 82 and operating or stopping of the fan 37 and the PG burner 34.

3. (During Power Generation by the Proton-Exchange Membrane Fuel Cell Power Generating Equipment GS1 of the Present Invention, if the Hot Water Reserving Tank 50 is Filled with Hot Water)

If the hot water reserving tank 50 is filled with hot water of a predetermined temperature during power generation by the fuel cell 6, and the hot water is not supplied to the outside through the hot water supply pipe 62, additional exhaust heat of the PEFC equipment GS1 cannot be recovered. Therefore, if the temperature (measured by the thermometer T2) of the water in the tank 21 is equal to or greater than the predetermined value (for example, 80° C. or higher), the fan 37 for feeding air to the PG burner 34 is operated (without operating the PG burner) to decrease the temperature of the hot water using the heat exchanger 46 as a cooler. The cooled water is circulated through the line L1 by closing the on-off valve 81 and opening the on-off valve 82 to cool the water in the water tank 21. (See FIG. 2.) The table in the FIG. 2 indicates open/close states of the on-off valve 81, 82 and operating or stopping of the fan 37 and the PG burner 34.

If the temperature (measured by the thermometer T2) of the water in the tank 21 is lower than the predetermined value (for example, lower than 80° C.), the on-off valve 81 is opened and the on-off valve 82 is closed, so as not to feed hot water to the line L1, but to feed the water (that has been heated by recovering exhaust heat) to the hot water reserving tank 50 through the line L2. (See FIG. 3.) The table in the FIG. 3 indicates open/close states of the on-off valves 81, 82 and operating or stopping of the fan 37 and the PG burner 34.

The on-off valves 81, 82 can be opened or closed manually, and the fan 37 and the PG burner 34 can be operated or stopped manually, too. However, preferably, these operations are performed automatically with a controller (not shown).

4. (If Water in the Water Tank 21 is Likely to Freeze While Operation of the Proton-Exchange Membrane Fuel Cell Power Generating Equipment GS1 of the Present Invention is Stopped)

Figure 4:
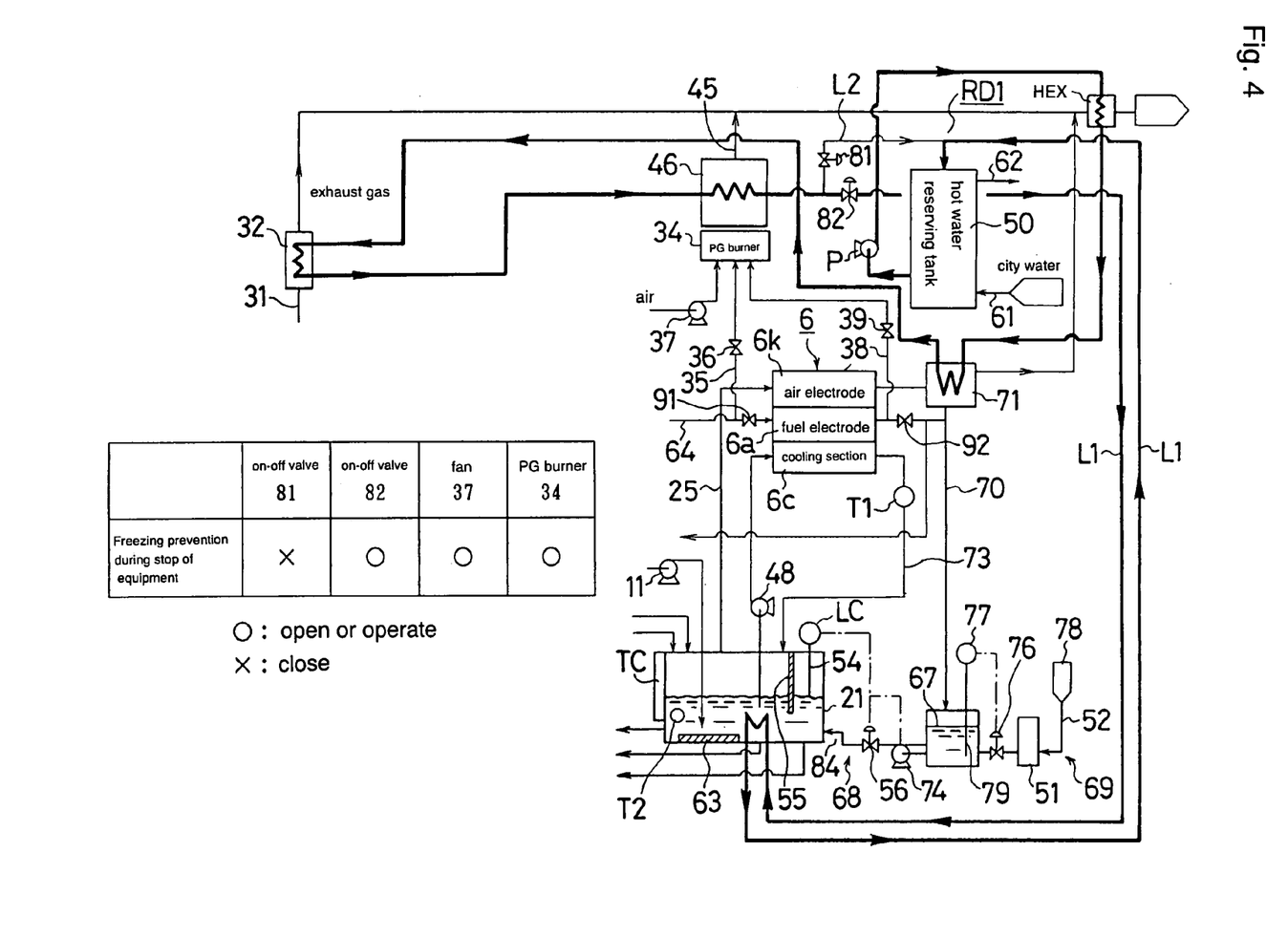
FIG. 4 is a diagram of an exemplary hot water flow for preventing freezing in the proton-exchange membrane fuel cell power generating equipment of FIG. 1.

As shown in FIG. 4, if the temperature of the water tank 21 becomes less than or equal to a predetermined value (for example, 2° C. or lower), such that there is a possibility that water in the system will freeze, a controller (not shown) sends a signal to the PG burner 34, the fan 37, the on-off valves 81, 82, and the pump P to activate the fan 37 and to ignite the PG burner 34. The controller also closes the on-off valve 81 of the line L2, opens the on-off valve 82 of the line L1, and operates the pump P to circulate hot water from the hot water reserving tank 50, including water whose temperature is increased by recovering heat at the heat exchanger 46 connected to the PG burner 34, resulting in heating the water of the water tank 21. The table in FIG. 4 indicates open/close states of the on-off valves 81, 82 and operating states of the fan 37 and the PG burner 34.

If a temperature detecting means (thermometer) (not shown) detects that the temperature of the fuel cell 6 body is less than or equal to a predetermined value (for example, 2° C. or lower), such that there is a possibility that the fuel cell 6 body will freeze, the PG burner 34 is activated and the controller (not shown) sends a signal to the pump 48 to operate the pump 48 to circulate the hot water in a cooling section 6c of the fuel cell 6 to increase the temperature of the fuel cell 6 body to prevent freezing.

If a temperature detecting means (thermometer) (not shown) detects that the temperature of the atmosphere in the fuel cell power generating equipment GS1 is less than or equal to a predetermined value (for example, 2° C. or lower), such that there is a possibility that the water system will freeze, the PG burner 34 is activated and the controller (not shown) sends a signal to the pump 48 to operate the pump 48 to circulate hot water in a cooling section 6c of the fuel cell 6 to increase the temperature of the fuel cell 6 body to prevent freezing.

The operation of the process gas burner 34 has been described above. However, the hot water of the hot water reserving tank 50 could be circulated in a part or the whole of the water system without operating the process gas burner 34 to prevent freezing.

If the temperature (measured by the thermometer T2) of the water in the tank 21 is equal to or greater than 10° C., for example, a controller (not shown) sends a signal to the PG burner 34, the fan 37, and the pump P (exhaust heat recovery pump) to stop operation of them. Thus, the pump P, the PG burner 34, and the fan 37 are intermittently operated to prevent freezing.

5. (If Water in the Water System, Including the Hot Water Reserving Tank 50, has a Possibility of Freezing While Operation of the Proton-Exchange Membrane Fuel Cell Power Generating Equipment GS1 of the Present Invention is Stopped)

If the temperature of the water in the tank 21 is equal to or greater than the predetermined value (for example, 2° C. or higher) but a temperature monitored and measured by another thermometer (not shown) installed in the water system, including the hot water reserving tank 50, is less than or equal to the predetermined value (for example, 2° C. or lower), such that there is a possibility of freezing, a controller (not shown) sends a signal to the PG burner 34, the fan 37, the on-off valves 81, 82, and the pump P to activate the fan 37 and operate (ignite) the PG burner 34, and opens the on-off valve 81 of the line L2, closes the on-off valve 82 of the line L1, and operates the pump P to circulate water through the heat exchanger 46 connected to the PG burner 34, thereby heating the water of the water system, including the hot water reserving tank 50. (See FIG. 5.) The heavy line shows flow of the hot water, and the table indicates open/close states of the on-off valves 81, 82 and operating states of the fan 37 and the PG burner 34.

Figure 5:
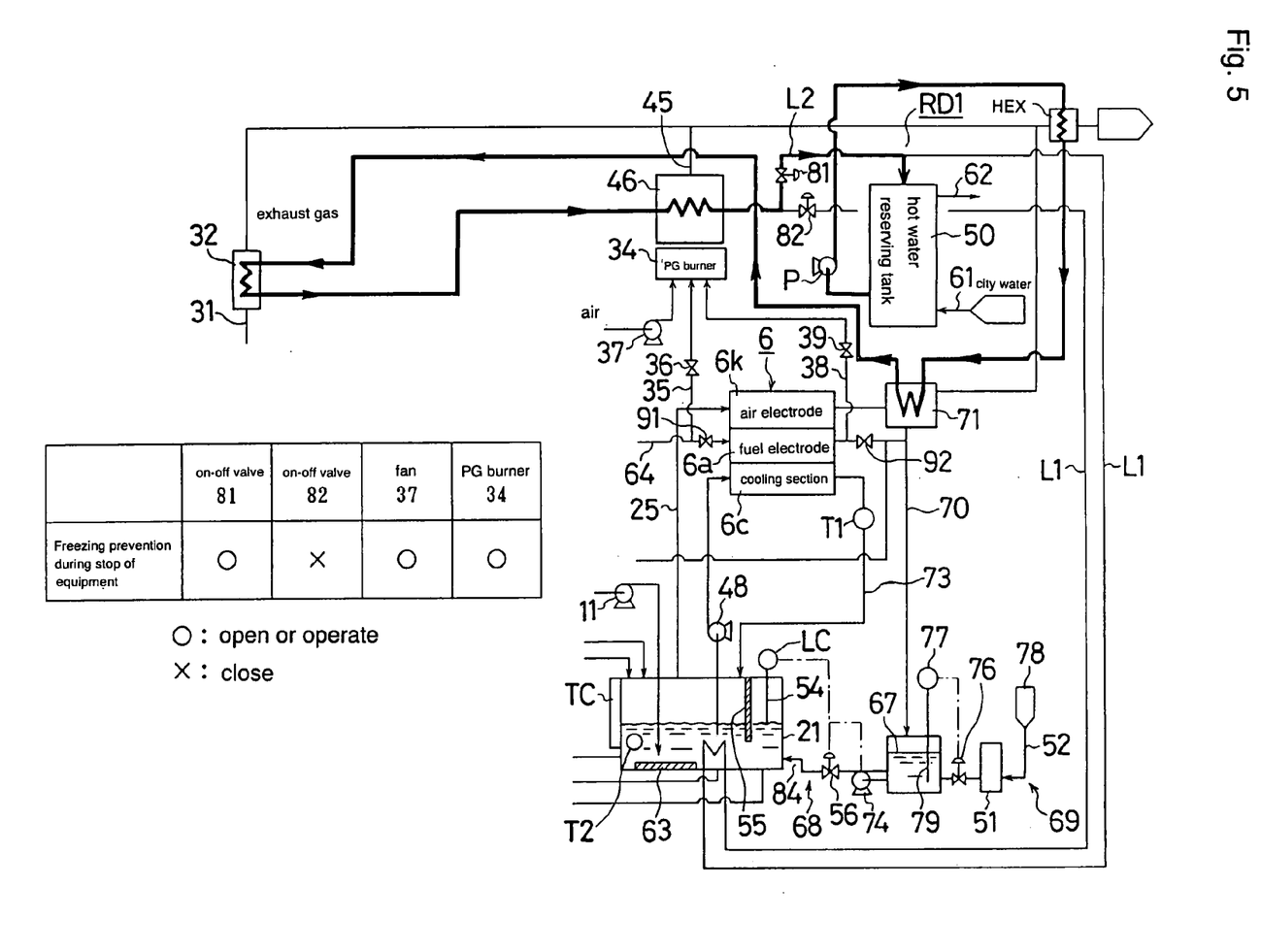
FIG. 5 is a diagram of another exemplary the hot water flow for preventing freezing in the proton-exchange membrane fuel cell power generating equipment of FIG. 1.

If the water temperature of the water system, including the hot water reserving tank 50, is 10° C. or warmer, for example, the controller (not shown) sends a signal to the PG burner 34 and the fan 37 to stop operation of them. Thus, the pump P, the PG burner 34, and the fan 37 are intermittently operated to prevent freezing.

6. (Exhaust Gas Heat Recovering Method 1)

The fuel cell 6 normally operates at about 80° C., but heat generation due to the electrochemical reaction sometimes increases this temperature. To prevent such a temperature increase, water is supplied from the water tank 21 to the cooling section 6c of the fuel cell 6 by the pump 48 to cool the fuel cell 6. After cooling the fuel cell 6, the water is returned to the water tank 21, but the amount of water in the tank 21 gradually decreases. Therefore, water is added as needed. Pure water is produced by a purifying procedure that uses an ion-exchange resin 51 and a reserve supply tank 67. Moisture (including moisture from unreacted oxygen gas) collected from the third heat exchanger 71 is also fed to the supply tank 67.

During operation of the fuel cell power generating equipment, water in the bottom of the hot water reserving tank 50 (at approximately 20° C. or room temperature, for example) is taken out by the pump P and fed to the fourth heat exchanger HEX through the first duct S1, as shown in FIG. 1. The exhaust gas passing through the fourth heat exchanger HEX is a mixture of gases. This mixture includes the combustion exhaust gas from the reformer burner 12, the combustion exhaust gas from the PG burner 34, and the non-reacted oxygen gas from the fuel cell 6. The combustion exhaust gas from the reformer burner 12 passes through the heat exchanger 17 and the first heat exchanger 32, so that its temperature is decreased before reaching the heat exchanger HEX. The combustion exhaust gas from the PG burner 34 passes through the second heat exchanger 46, so that its temperature is also decreased before reaching the heat exchanger HEX. The unreacted oxygen gas from the fuel cell 6 passes through the third heat exchanger 71, so that its temperature is also decreased on its way to the heat exchanger HEX. Therefore, the temperature level of the mixed gas passing through the fourth heat exchanger HEX is low, about 50–60° C.

Water heated by the fourth heat exchanger HEX is fed to the third heat exchanger 71 through the second duct S2. Heat is extracted from the non-reacted oxygen gas exhausted from the air electrode of the fuel cell 6. The temperature level in the third heat exchanger 71 is about 70–80° C.

For the next step, the water is fed to the first heat exchanger 32 through the third duct S3. Heat is extracted from the combustion exhaust gas passing through the first heat exchanger 32. This combustion exhaust gas is the combustion exhaust gas from the reformer burner 12, but the gas passes through the heat exchanger 17 before entering the first heat exchanger 32. As a result, the temperature level of the first heat exchanger 32 is about 100–120° C.

The hot water is further fed from the first heat exchanger 32 to the second heat exchanger 46 through the fourth duct S4, and heat is extracted from the combustion exhaust gas from the PG burner 34. The temperature level of the second heat exchanger 46 is about 150–180° C. Hot water flows from the second heat exchanger 46 to the upper part of the hot water reserving tank 50 through the fifth duct S5. At this time, the first on-off valve 82 is opened and the second on-off valve 81 is closed.

The PG burner 34 is operated during startup, while the reformer 3 is unstable. (As noted above, the PG burner 34 is also sometimes operated when the power generation equipment is not operating.) Generally, after the reformed gas condition becomes stable, the PG burner 34 does not operate, and the second heat exchanger 46 does not extract heat during power generation. On the other hand, the burner 12 is operated to maintain the temperature of catalysts in the reformer 3 at a predetermined level during power generation. The required fuel is supplied by feeding the unreacted oxygen gas exhausted from the fuel electrode of the fuel cell 6 to the burner 12, as discussed above.

The water in the bottom of the hot water reserving tank 50 passes through the heat exchangers sequentially in the order described above, i.e., from the lowest temperature heat exchanger through progressively higher temperature heat exchangers to become hot (about 60–70° C.). The water is returned to the upper part of the hot water reserving tank 50. The heat exchange efficiency of each heat exchanger is high, because progressively warmer water passes through progressively hotter heat exchangers. Thus, the temperature differential between the water and each progressive heat exchanger is high.

7. (Exhaust Gas Heat Recovering Method 2)

Figure 6:
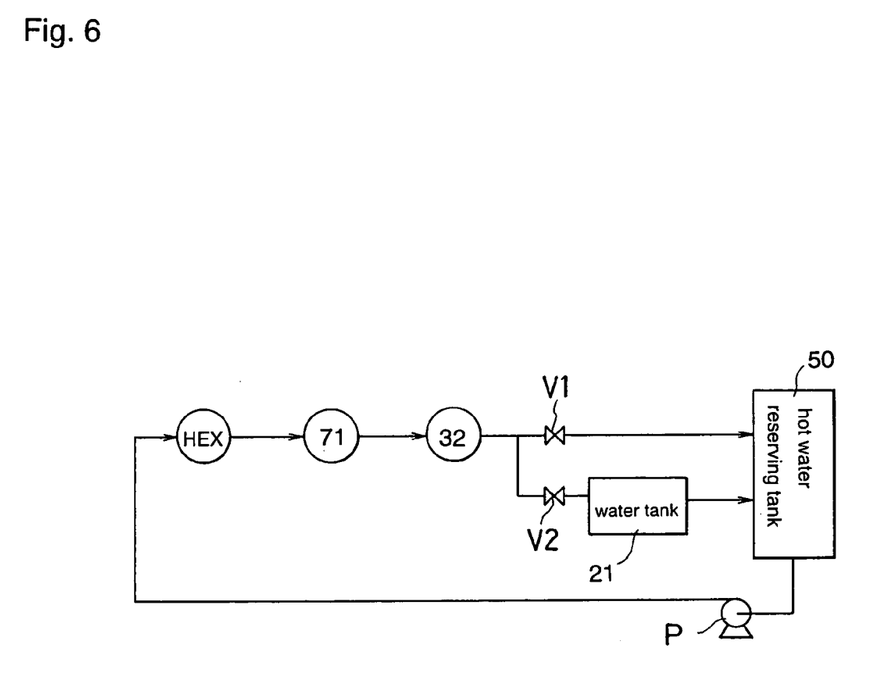
FIG. 6 is a block diagram of a part of the heat recovery route of an embodiment of the power generating equipment of FIG. 1.

FIG. 6 shows another exemplary embodiment of the exhaust heat recovering method of the present invention. FIG. 6 is a block diagram of only a part of the structure of the fuel cell power generating equipment of FIG. 1.

A loop-like duct is formed that extends from the hot water reserving tank 50 through the fourth heat exchanger HEX, the third heat exchanger 71, and the first heat exchanger 32, in that order, then back to the hot water reserving tank 50. A first selector valve V1 is installed between the first heat exchanger 32 in the duct and the hot water reserving tank 50. A branch duct is formed from an intermediate point between the first selector valve V1 and the first heat exchanger 32. The branch duct diverts hot water through a heat exchanger in the water tank 21 before returning to the hot water reserving tank 50. Water in the water tank 21 is usually used to cool the fuel cell 6. This diversion allows heat to be exchanged with the water in the water tank 21. A second selector valve V2 is installed on the upstream side of the water tank 21 in the branch duct.

If the temperature of the water in the tank 21 is at or above a predetermined value (for example, 80° C.) during power generation by the fuel cell 6, the first selector valve V1 is closed and the second selector valve V2 is opened. The water taken out of the bottom of the hot water reserving tank 50 by the pump P is fed through the fourth heat exchanger HEX, the third heat exchanger 71, the first heat exchanger 32 (in this order), and then (via the branch duct) through the heat exchanger in the water tank 21. The water then returns back to the hot water reserving tank 50. In this way, the water can recover heat from the water in the water tank 21 and transfer that heat to water in the hot water reserving tank 50.

On the other hand, if the temperature of the water in the tank 21 is less than a predetermined value (for example, 76° C.), the first selector valve V1 is opened and the second selector valve V2 is closed. The water taken out of the bottom of the hot water reserving tank 50 is fed by the pump P to the fourth heat exchanger HEX, the third heat exchanger 71, and the first heat exchanger 32 (in this order), then returned to the hot water reserving tank 50. In this case, the water is not fed through the water tank 21 through the branch duct. In other words, heat is not recovered from the water tank 21.

When the fuel cell power generating equipment is not operating, the fuel cell 6 is cool, and the water temperature in the water tank 21 can decrease. During cold weather, hot water is fed through the heat exchanger in the water tank 21. For supplying hot water to the heat exchanger in the water tank 21, the first selector valve V1 is closed and the second selector valve V2 is opened to allow hot water to flow through the branch duct to feed the hot water through the water tank 21. Then, the water is returned to the hot water reserving tank 50.

If the water in the water tank 21 is hot, air fed through the water tank 21 and then to the air electrode of the fuel cell 6 heats the fuel cell 6 in a short time, thereby shortening starting-up time of the system.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. Power generating equipment, comprising:
   a reformer for reforming fuel gas such as natural gas, town gas, methanol, LPG, or butane to hydrogen rich gas;
   a first heat exchanger for heat exchange with combustion exhaust gas from a reformer burner of the reformer;
   a CO transformer for transforming carbon monoxide;
   CO removing apparatus for removing the carbon monoxide;
   a process gas burner for burning hydrogen until each reactor becomes stable during startup;
   a second heat exchanger for heat exchange with combustion exhaust gas from said process gas burner;
   a fuel cell for generating power using the hydrogen;
   a third heat exchanger installed in relation to said fuel cell;
   a cooling water tank for storing water for cooling said fuel cell;
   a heat exchanger for recovering beat of exhaust gas of said reformer, said fuel cell, or said process gas burner and heating the water to produce hot water;
   a fourth heat exchanger installed in relation to a duct for passing the combustion exhaust gases from the reformer burner and said process gas burner and non-reacted oxygen gas from said fuel cell;
   a hot water reserving tank for reserving the hot water,
   wherein said hot water reserving tank and the first, second, third and fourth heat exchangers are interconnected by piping to form a loop duct, and the water in said hot water reserving tank is supplied sequentially, via the loop duct, through the fourth heat exchanger, the third heat exchanger and the first heat exchanger, in this order, back to said hot water reserving tank; further comprising:
   a first selector valve installed between the first heat exchanger and the hot water reserving tank;
   a branch duct branching from an intermediate part between the first selector valve and the first beat exchanger, passing through the cooling water tank and reaching the hot water reserving tank; and
   a second selector valve installed on the upstream side of said cooling water tank in the branch duct; and
   wherein during power generation by said fuel cell, when the water in the cooling water tank is above a predetermined temperature, the first selector valve is closed and the second selector valve is opened to pass water through the branch duct to recover heat from said cooling water tank and, when the water in said cooling water tank is below the predetermined temperature, the first selector valve is opened and the second selector valve is closed to not supply water to the branch duct.

2. Power generating equipment, comprising:
a reformer having an output;
a first gas burner thermally coupled to the reformer;
a fuel cell having:
   an input communicably coupled to the output of the reformer; and
   an output;
a process gas burner distinct from the first gas burner, the process gas burner having:
   an air input;
   a gas input communicably coupled to the output of the reformer and to the output of the fuel cell; and
   an exhaust;
a beat exchanger communicably coupled to the exhaust of the process gas burner,
a fan communicably coupled to the air input of the process gas burner and, therethrough, to the heat exchanger;
a first water tank communicably coupled to the heat exchanger;
a first pump communicably coupled to the first water tank and the heat exchanger for circulating water therethrough; and
a controller controlling operation of the process gas burner, the fan and the first pump, wherein, if the temperature of the water in the first water tank exceeds a first predetermined value, the first pump circulates the water through the heat exchanger without operating the process gas burner, thereby cooling the water in the first water tank.

3. The power generating equipment of claim 2 wherein the first predetermined value is about 80° C.

4. The power generating equipment of claim 2, wherein if the temperature of the water in the first water tank exceeds the first predetermined value, the fan operates to blow air through the heat exchanger.

5. The power generating equipment of claim 4, wherein the first predetermined value is about 80° C.

6. The power generating equipment of claim 2, wherein if the temperature of the water in the first water tank is below a second predetermined value, the process burner operates and the pump circulates the water through the heat exchanger, thereby heating the water in the water tank.

7. The power generating equipment of claim 6, wherein the second predetermined value is about 2° C.

8. The power generating equipment of claim 2, wherein if the temperature of the water in the first water tank is below a second predetermined value, the process burner operates and the first pump circulates the water through the heat exchanger, thereby heating the water in the first water tank, until the temperature of the water in the first water tank reaches a third predetermined value.

9. The power generating equipment of claim 8, wherein the second predetermined value is about 2° C.

10. The power generating equipment of claim 9, wherein the third predetermined value is about 10° C.

11. The power generating equipment of claim 2, wherein the fuel cell also has a cooling section; and further comprising:
a second water tank communicably coupled to the cooling section of the fuel cell;
a heat exchanger disposed within the second water tank and communicably coupled to the first water tank for circulating water therethrough; and
a second pump communicably coupled to the second water tank and the cooling section of the fuel cell to circulate water therethrough; and
wherein, if the temperature of the water in the second water tank exceeds a fourth predetermined value, the controller causes water to circulate through the heat exchanger in the second water tank and the first water tank, thereby recovering heat from the second water tank and transferring the heat to the first water tank.

12. The power generating equipment of claim 11, wherein the fourth predetermined value is about 80° C.

13. Power generating equipment comprising:
a reformer having an output;
a first gas burner thermally coupled to the reformer;
a fuel cell having:
   an input communicably coupled to the output of the reformer;
   an output; and
   a cooling section;
a first water tank communicably coupled to the cooling section of the fuel cell;
a first pump communicably coupled to the first water tank and the cooling section of the fuel cell to circulate water therethrough;
a controller controlling operation of the first pump, wherein if the fuel cell is below a first predetermined temperature, the first pump circulates water through the cooling section of the fuel cell, thereby warming the fuel cell;
a first heat exchanger thermally coupled to the first water tank;
a process gas burner distinct from the first gas burner, the process gas burner having:
   a gas input communicably coupled to the output of the reformer and to the output of the fuel cell; and
   an exhaust;
a second heat exchanger communicably coupled to the exhaust of the process gas burner;
a second water tank communicably coupled to the first and second heat exchangers; and
a second pump communicably coupled to the second water tank and the first and second heat exchangers for circulating water therethrough; and
wherein the controller controls operation of the process gas burner and the second pump such that, if the fuel cell is below the first predetermined temperature, the process gas burner and the second pump operate to circulate the water through the second heat exchanger, heat the circulated water and circulate the heated water through the first heat exchanger in the first water tank, thereby heating water in the first water tank.

14. The power generating equipment of claim 13, wherein the first predetermined temperature is about 2° C.

15. The power generating equipment of claim 13, wherein, the process gas burner and the second pump operate until the temperature of the fuel cell reaches a second predetermined value.

16. The power generating equipment of claim 15, wherein the first predetermined value is about 2° C.

17. The power generating equipment of claim 16, wherein the second predetermined value is about 10° C.

18. The power generating equipment of claim 17, wherein:
the water system also includes a heat exchanger communicably coupled to the exhaust of the process gas burner; and
the controller controls operation of the process gas burner and, if the controller detects the risk of freezing, the controller causes the process gas burner to operate and water to circulate through the heat exchanger, thereby heating the water circulating through the heat exchanger.

19. Power generating equipment comprising:
a reformer having an output;
a first gas burner thermally coupled to the reformer;
a fuel cell having:
an input communicably coupled to the output of the reformer; and
an output;
a process gas burner distinct from the first gas burner, the process gas burner having:
a gas input communicably coupled to the output of the reformer and to the output of the fuel cell; and
an exhaust;
a water system including a water tank;
a pump communicably coupled to the water system for circulating water therethrough;
means for detecting a risk of freezing; and
a controller coupled to the means for detecting the risk of freezing and controlling operation of the pump, wherein if the controller detects the risk of freezing, the pump circulates the water through at least a portion of the water system,
wherein the means for detecting the risk of freezing comprises means for detecting the temperature of the water in the water tank.

20. Power generating equipment comprising:
a reformer having an output;
a first gas burner thermally coupled to the reformer;
a fuel cell having:
an input communicably coupled to the output of the reformer; and
an output;
a process gas burner distinct from the first gas burner, the process gas burner having:
a gas input communicably coupled to the output of the reformer and to the output of the fuel cell; and
an exhaust;
a water system including a water tank;
a pump communicably coupled to the water system for circulating water therethrough;
means for detecting a risk of freezing; and
a controller coupled to the means for detecting the risk of freezing and controlling operation of the pump, wherein if the controller detects the risk of freezing, the pump circulates the water through at least a portion of the water system,
wherein the means for detecting the risk of freezing comprises means for detecting the temperature of the fuel cell.

21. Power generating equipment comprising:
a reformer having an output;
a first gas burner thermally coupled to the reformer;
a fuel cell having:
an input communicably coupled to the output of the reformer; and
an output;

a process gas burner distinct from the first gas burner, the process gas burner having:
a gas input communicably coupled to the output of the reformer and to the output of the fuel cell; and
an exhaust;
a water system including a water tank;
a pump communicably coupled to the water system for circulating water therethrough;
means for detecting a risk of freezing; and
a controller coupled to the means for detecting the risk of freezing and controlling operation of the pump, wherein if the controller detects the risk of freezing, the pump circulates the water through at least a portion of the water system,
wherein the means for detecting the risk of freezing comprises means for detecting the temperature of an atmosphere in the power generating equipment.

22. Power generating equipment, comprising:
a reformer having an output;
a first gas burner having an exhaust and being thermally coupled to the reformer;
a fuel cell having:
an input communicably coupled to the output of the reformer; and
an output;
a process gas burner, distinct from the first gas burner, having:
an input communicably coupled to the output of the fuel cell; and
an exhaust; and
a heat exchanger communicably coupled to the first gas burner, the fuel cell and the process gas burner, such that a combination of gases from the exhaust of the first gas burner, the output of the fuel cell and the exhaust of the process gas burner flow through the heat exchanger.

23. Power generating equipment, comprising:
a fuel cell having:
an air input; and
a cooling section;
a water tank;
a pump communicably coupled to the water tank and the cooling section of the fuel cell for circulating water therethrough;
means for heating the water in the water tank;
means for supplying moist air to the air input of the fuel cell;
a controller controlling operation of the pump, the means for heating the water in the water tank and the means for supplying moist air, wherein, during startup of the fuel cell, water is circulated through the cooling section of the fuel cell and moist air is applied to the air input of the fuel cell, thereby raising the temperature of the fuel cell.

24. The power generating equipment of claim 23, wherein the means for heating the water in the water tank comprises a first heat exchanger communicably coupled to a second heat exchanger, the second heat exchanger being thermally coupled to an exhaust of a process burner.

25. The power generating equipment of claim 23, wherein the means for supplying the moist air comprises the water tank, wherein the water tank is partially filled with water and partially filled with air.

26. The power generating equipment of claim 25, wherein the means for heating the water in the water tank comprises a first heat exchanger communicably coupled to a second heat exchanger, the second heat exchanger being thermally coupled to an exhaust of a process burner.

* * * * *

UNITED STATES PATENT AND TRADEMARK OFFICE
CERTIFICATE OF CORRECTION

PATENT NO. : 7,052,787 B2
APPLICATION NO. : 10/221338
DATED : May 30, 2006
INVENTOR(S) : Osamu Tajima et al.

It is certified that error appears in the above-identified patent and that said Letters Patent is hereby corrected as shown below:

Column 14, claim 1, line 60, "beat" should read --heat--; and

Column 15, claim 2, line 20, "beat" should read --heat--.

Signed and Sealed this

Twenty-seventh Day of March, 2007

JON W. DUDAS
*Director of the United States Patent and Trademark Office*